United States Patent [19]

Kotthaus

[11] Patent Number: 4,664,569
[45] Date of Patent: May 12, 1987

[54] GEAR CUTTING METHOD AND MACHINE FOR CUTTING SPIRAL BEVEL GEARS AND CONTRATE GEAR FACE CLUTCHES

[75] Inventor: Erich Kotthaus, Wallisellen, Switzerland

[73] Assignee: Werkzeugmaschinenfabrik Oerlikon-Bührle AG, Zürich, Switzerland

[21] Appl. No.: 789,443

[22] Filed: Oct. 21, 1985

[30] Foreign Application Priority Data

Nov. 23, 1984 [CH] Switzerland ............... 5603/84

[51] Int. Cl.⁴ .............................. B23F 9/14
[52] U.S. Cl. .......................... 409/28; 409/5; 409/30
[58] Field of Search .............. 409/25, 26, 27, 28, 409/29, 30, 31, 50, 51, 52, 53, 43, 45, 5; 74/459.5

[56] References Cited

U.S. PATENT DOCUMENTS 3,583,278 6/1971 Baxter et al. ............... 409/26
3,971,293 7/1976 Hunkeler .

FOREIGN PATENT DOCUMENTS 0059992 9/1952 European Pat. Off. .
838092 5/1952 Fed. Rep. of Germany ........ 409/29
1056453 4/1959 Fed. Rep. of Germany .
271703 2/1951 Switzerland .

OTHER PUBLICATIONS

G. Henriot, "Traité Théorique et Pratique des Engrenages", vol. II, Fabrication-Controle-Lubrification-Traitement Thermique", 1972.
K. F. Keck, "Die Zahnradpraxis", part 11: Schrägzahnstirnräder, Geradzahn- und Psiral-Kegelräder, 1958.

*Primary Examiner*—Robert L. Spruill
*Assistant Examiner*—Donald R. Studebaker
*Attorney, Agent, or Firm*—Werner W. Kleeman

[57] ABSTRACT

In order to increase the working range of existing designs of gear cutting machines upon which gear teeth based upon an extended epicycloid are cut according to the continuous gear-cutting process, the workpiece and cutter spindles of a gear cutting machine are driven in identical directions of rotation by a reversing drive train. A reversible auxiliary drive is connected to an end of a primary drive train remote from a main drive for maintaining the primary drive train interconnecting the workpiece and cutter spindles under constant load, i.e. for suppressing backlash in the primary drive train. This permits the practical fabrication of gears (i.e. the practical cutting of gear teeth) based upon a hypocycloid instead of an epicycloid.

10 Claims, 3 Drawing Figures

GEAR CUTTING METHOD AND MACHINE FOR CUTTING SPIRAL BEVEL GEARS AND CONTRATE GEAR FACE CLUTCHES

BACKGROUND OF THE INVENTION

The present invention broadly relates to gear cutting machines and, more specifically, pertains to a new and improved construction of a gear cutting machine for cutting spiral bevel gears and contrate gear face clutches according to the continuous gear-cutting process.

Generally speaking, the gear cutting machine of the present invention is for cutting spiral bevel gears and contrate gear face clutches having cycloidal tooth flank lines or generatrices according to the continuous gear-cutting process and comprises a rotary first spindle for mounting a cutting tool or gear tooth cutter, a rotary second spindle for holding a workpiece or gear blank, a primary drive train operatively interconnecting the first and second spindles and having a termination at the second spindle, and a reversible main drive means operatively connected to the primary drive train for simultaneously driving the first and second spindles.

A first method of the present invention is for cutting spiral bevel gears and contrate gear face clutches having hypocycloidal tooth flank lines or generatrices according to the continuous gear-cutting process by means of a gear cutting machine according to the present invention. A second method of the present invention is for cutting spiral bevel gears and contrate gear face clutches having epicycloidal tooth flank lines or generatrices according to the continuous gear-cutting process by means of a gear cutting machine according to the present invention.

Methods for cutting bevel gears with curved teeth according to the continuous gear-cutting process are known, such as for instance, the method known from the Swiss Patent No. 271,703, published Feb. 16, 1951. According to this known method the eccentricity of the gear tooth cutter axis in relation to the main axis of the machine can be determined according to various formulae for mutually identical and mutually opposed directions of rotation of the gear tooth cutter and for an idealized contrate gear. Gear tooth cutters are also disclosed for which the magnitude of the orientation or set-up angle of the cutter blades of the gear tooth cutter can also be determined from various formulae for mutually identical and mutually opposed directions of rotation of the gear tooth cutter and the contrate gear.

It is thus known that gears which have epicycloidal gear tooth flank lines or generatrices can be generated according to the continuous gear-cutting process by rotating the workpiece or gear blank and the tool or gear tooth cutter in mutually opposed directions of rotation. This procedure is also known as counter-cutting or counter-milling. It is likewise known that gears having hypocycloidal gear tooth flank lines or generatrices can be generated according to the continuous gear-cutting process by rotating the workpiece or gear blank and the tool or gear tooth cutter in mutually identical directions of rotation. This procedure is also called forward cutting or climb-milling.

However, only counter cutting based upon the generation of an extended epicycloid has prevailed in practice for fabricating bevel gears according to the continuous gear cutting process. Tool or gear tooth cutter spindles and workpiece or gear blank spindles are mechanically coupled by a transmission or drive train and driven by a single motor in mutually opposed directions of rotation. In order to reduce chatter or backlash in the drive train during gear-cutting, which is conjointly induced by the intermittency of the cutting force or torque and play or clearances in the drive train, a braking torque is exerted upon the workpiece or gear blank spindle, usually by mechanical or hydraulic braking devices. Although this problem is controllable in counter-cutting procedures, in forward cutting or climb-milling procedures it is exacerbated to such an extent that the fabrication of bevel gears having hypocycloidal tooth flank lines or generatrices has not heretofore been undertaken.

A gear generating miller or milling machine is known from the German Patent Publication No. 1,056,453, published Apr. 30, 1959, which has a drive train or transmission between the tool or cutter and the workpiece or gear blank as well as a circular or rotary table or workpiece support fitted with a worm wheel or worm gear ring or rim. The circular table is rotatably mounted between a first worm engaging the worm gear ring and a second worm engaging the worm gear ring and driving the worm gear ring. The first worm forms a termination of the drive train between the tool or cutter and the workpiece or gear blank. The first worm serves only to enable or permit rotation of the round table without driving it, while the drive of the second worm is tapped from a power take-off point lying outside of the drive train between the tool or gear tooth cutter and the workpiece or gear blank. The first and the second worms are preferably driven by separate motors, e.g. hydraulic or electric motors.

Another machine for cutting gear teeth of gear wheels according to the generating process is known from the German Patent No. 2,611,544 and the corresponding U.S. Pat. No. 3,971,293, granted July 27, 1976. A gear cutter or cutter head spindle is mounted in a generating drum or roll cradle and driven by a first drive means. The generating drum and a workpiece or gear blank spindle are connected in temporal dependence with one another by a gear-generating drive train. The generating drum and the workpiece spindle are simultaneously driven in at least one direction of rotation by a second drive means arranged between the generating drum and the workpiece spindle. A third drive means drives the gear-generating drive train in the same direction of rotation as the second drive means and is arranged at the workpiece spindle. This arrangement maintains the gear-generating drive train under constant load during generating milling, i.e. suppresses backlash.

Known gear cutting machines for cutting spiral bevel gears having epicycloidal tooth flank lines or generatrices according to the continuous gear cutting process are grouped in model series or classes of construction type for fabricating gears ranging from small bevel gears of a few millimeters diameter to large bevel gears of several meters diameter and having epicycloidal tooth flank lines or generatrices. The range of application of these machines is determined by the diameter of the ring bevel gear, i.e. the larger of the gears of the bevel gear pair. This primarily depends upon the distance by which the gear tooth cutter or cutter head of the machine can be adjusted eccentric to the principal machine axis, i.e. to the axis of the generating drum or roll cradle. The greatest eccentricity is, in its turn, the major factor determining the generating drum or roll cradle size and is therefore a major factor in the overall dimensions of the machine. If sizes of bevel gear are to be fabricated which exceed the range of application, i.e. the working range, of a given size of machine, economical considerations such as a limited market can hinder the construction or acquisition of a correspondingly larger gear cutting machine and therefore the fabrication of such larger bevel gears.

SUMMARY OF THE INVENTION

Therefore, with the foregoing in mind, it is a primary object of the present invention to provide a new and improved construction of a gear cutting machine which does not exhibit the aforementioned drawbacks and shortcomings of the prior art constructions.

Another and more specific object of the present invention aims at providing a new and improved construction of a gear cutting machine of the previously mentioned type which permits the fabrication in an economical manner of bevel gears exceeding the heretofore fixed capacity or working range of an existing gear cutting machine.

A further significant object of the present invention aims at providing a new and improved method for cutting spiral bevel gears and contrate gear face clutches having cycloidal tooth flank generatrices according to the continuous gear-cutting process and permitting the fabrication of such gears in larger sizes than was heretofore possible on a given machine.

Yet a further significant object of the present invention aims at providing a new and improved construction of a gear cutting machine of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the gear cutting machine of the present invention is manifested by the features that the primary drive train comprises an intermediate reversing drive train for selectively engaging or selecting a desired one of mutually identical and mutually opposed directions of rotation for the first and second spindles. The gear cutting machine further comprises a reversible auxiliary drive means connected to the termination of the primary drive train for supplementally driving the second spindle to maintain the primary drive train under substantially constant load, i.e. for suppressing backlash in the primary drive train.

The first method of the present invention is manifested by the features that it comprises the steps of operating the reversible main drive means to drive the first spindle in a desired direction of cutter rotation and operating the reversing drive train to engage or select a direction of workpiece rotation of the second spindle identical to the desired direction of cutter rotation of the first spindle for suppressing backlash in the primary drive train.

The second method of the present invention is manifested by the features that it comprises the steps of operating the reversible main drive means to drive the first spindle in a desired direction of cutter rotation, operating the reversing drive train to engage or select a direction of workpiece rotation of the second spindle opposed to the desired direction of cutter rotation of the first spindle, and operating the reversible auxiliary drive means to drive the second spindle in a direction of workpiece rotation of the second spindle opposed to the desired direction of cutter rotation of the first spindle for suppressing backlash in the primary drive train.

The invention primarily consists in the realization that, by performing simple modifications to known machines, the presently greatest spiral bevel ring gear diameter allowable on a given machine size can be considerably increased when gears with hypocycloidal tooth flank lines or generatrices are to be fabricated. This is so because for a given maximum machine eccentricity or eccentric spacing the allowable gear diameter, when cutting according to a hypocycloid, is considerably greater than when cutting according to an epicycloid.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
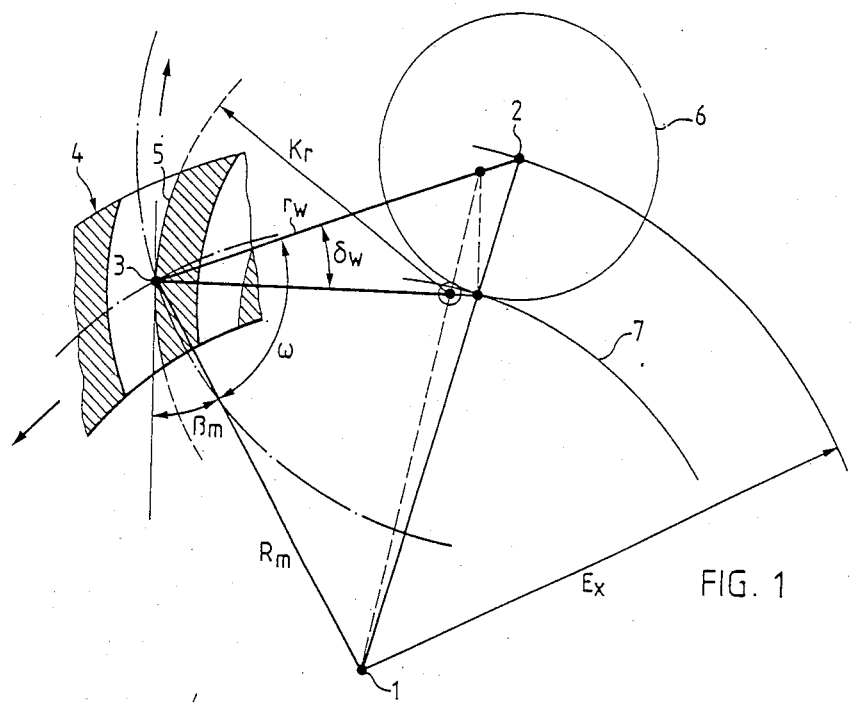
FIG. 1 schematically shows the tooth flank lines or generatrices produced upon an idealized contrate gear in the continuous gear-cutting process according to extended epicycloids.
Figure 2:
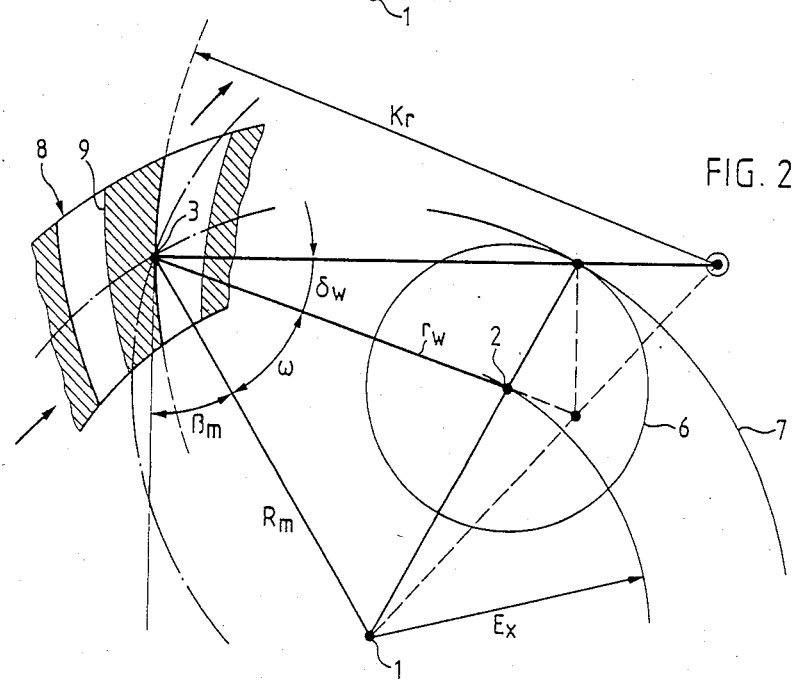
FIG. 2 schematically shows the tooth flank lines or generatrices produced on an idealized contrate gear by the continuous gear-cutting process according to extended hypocycloids.

Describing now the drawings, it is to be understood that to simplify the showing thereof only enough of the structure of the gear cutting machine has been illustrated therein as is needed to enable one skilled in the art to readily understand the underlying principles and concepts of this invention. FIGS. 1 and 2 show the relationships known per se between a contrate or crown gear and a gear tooth cutter or cutter head in the continuous or non-intermittent gear-cutting process.

Turning now specifically to FIG. 1 of the drawings, it will be seen that tooth flank lines or generatrices 5 of a contrate gear or face clutch wheel 4 are produced as segments of extended epicycloids. Epicycloids are curves produced by rolling an auxiliary circle 6 known as an epicycle without slip along the exterior of the circumference of a base circle 7 or by the path of a point lying on a radius or an extended radius of the auxiliary circle or epicycle 6. A contrate gear radius $R_m$, a gear tooth cutter or cutter head radius $r_w$ and an eccentric spacing or distance $E_x$ conjointly define a triangle whose apices are established by a contrate gear center 1 which coincides with the center of the base circle 7, a gear tooth cutter or cutter head center 2 which coincides with the center of the auxiliary circle or epicycle 6 and a reference or computation point 3. The reference or computation point 3 corresponds to a point on the tooth flank line or generatrix 5 intersected by a point on the cutting edge of a not particularly shown cutting blade of an also not particularly shown gear tooth cutter or cutter head of the gear cutting machine.

The direction of motion of the gear tooth cutter or cutter head and of the contrate gear are indicated by arrows. Further variables or magnitudes known per se are an auxiliary angle $\omega$, a helix angle $\beta_m$, an orientation or set-up angle $\delta_w$ and a radius of curvature $K_r$ sweeping the reference or computation point 3 of the cycloid and, for the sake of simplification, defining the cycloid in approximation as a circular segment.

Turning now specifically to FIG. 2, the contrate gear 8 represented therein exhibits tooth flank lines or generatrices 9 formed by segments of extended hypocycloids. Hypocycloids are curves produced by rolling an auxiliary circle 6 known as a hypocycle along the interior of the circumference of the base circle 7. In both FIGS. 1 and 2 the contrate gear and the gear tooth cutter or cutter head and therefore the dimensions $R_m$ and $r_w$ have been depicted at the same size for the sake of clarity of the differences in geometry represented by the two figures. The same reference characters have also been generally employed to designate the same features. In comparing FIGS. 1 and 2, it will clearly be seen that for identical values of the dimensions $R_m$ and $r_w$, the value or magnitude $E_x$ is considerably smaller in FIG. 2. It will therefore be evident that the maximum allowable range of gear size determined by the contrate gear radius $R_m$ for a given maximum eccentric spacing $E_x$ of a given gear cutting machine is considerably increased when cutting according to an extended hypocycloid, as newly recognized by the present invention.

Furthermore, the radius of curvature $K_r$ also becomes greater, i.e. the teeth become straighter, and the direction of relative rotation between the workpiece or gear blank and the tool or gear tooth cutter is altered, i.e. reversed, so that in practice the tool or gear tooth cutter performs forward cutting or climb-cutting on the workpiece or gear blank.

The following formula:

$$E_x = \sqrt{R_m^2 + r_w^2 - 2R_m r_w \cos\omega} \quad (1)$$

can be transposed to produce:

$$R_m = r_w \cos\omega + \sqrt{E_x^2 - r_w^2 + (r_w \cos\omega)^2} \quad (2)$$

These formulae are important for determining the working range or capacity of a gear cutting machine. If it is assumed that:
a normal module $m_n = 8.5$;
a mean helix angle $\beta_m = 30°$;
a cutter radius $r_w = 160$ mm;
a number of cutter blades $Z_w = 13$;
an excentric spacing $E_x = 270$ mm; and
an orientation or set-up angle $\delta_w = 20°12'$;
then the following values result from the formula for $R_m$:

| | Epicycloids | Hypocycloids |
|---|---|---|
| Angle | 80°12' | 39°48' |
| $R_m$ max. | 246.42 mm | 372.65 mm |
| approx. max. allowable gear diameter | 575.00 mm | 870.00 mm |
| (outside dia.) | | | wherein $\omega = 90° - \beta_m + \delta_w$ for epicycloids and $\omega = 90° - \beta_m - \delta_w$ for hypocycloids.

Figure 3:
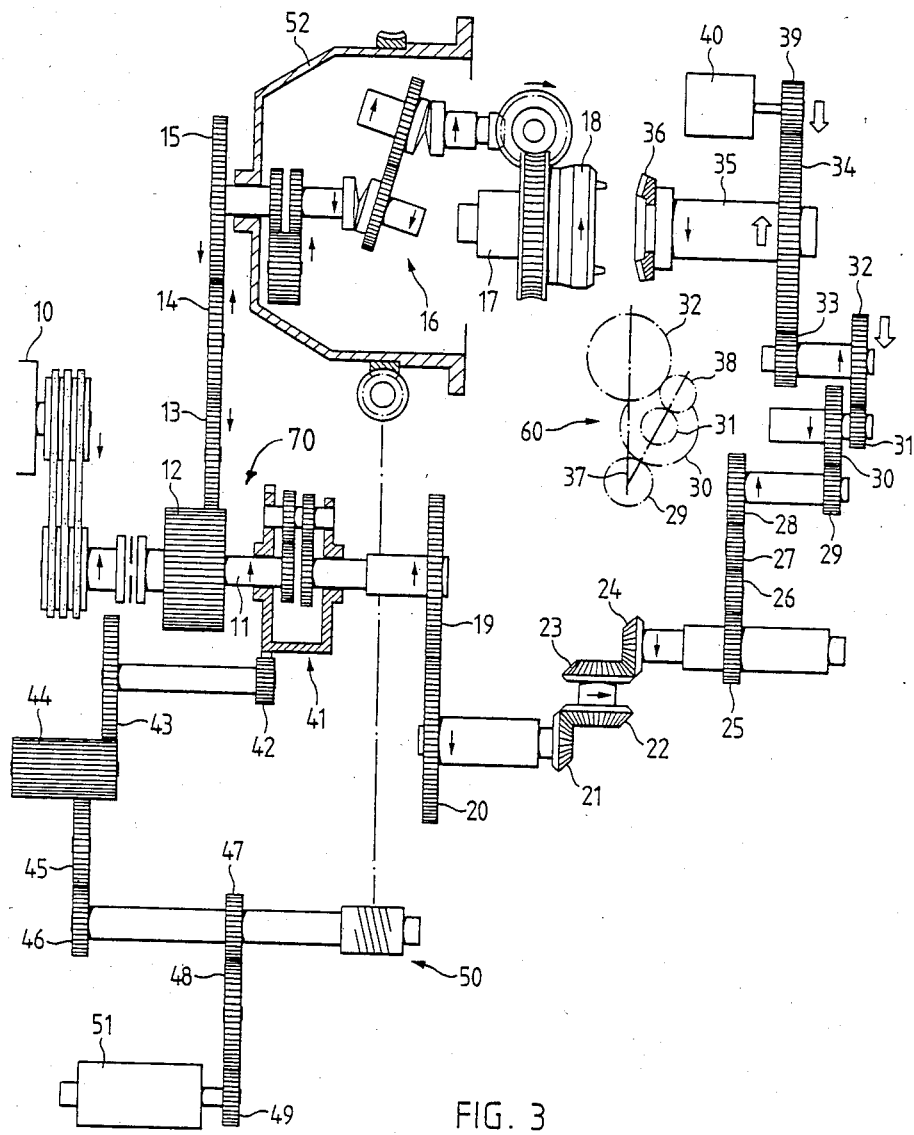
FIG. 3 schematically shows a drive system for a gear cutting machine.

Turning now specifically to FIG. 3 of the drawings, the apparatus illustrated therein by way of example and not limitation and employed to realize the methods as hereinbefore described will be seen to comprise selected components of a known gear cutting machine. The inventive alterations to be performed on this known gear cutting machine for permitting selective engagement of arrangements for cutting according to either epicycloids or hypocycloids can be seen in FIG. 3. For the sake of representational clarity, possible change gears or gear boxes have been omitted in the main or primary drive train and in the gear generating drive train. A main drive means 10, for instance a reversible electric motor, defining a third termination of the primary drive train drives a shaft 11 through a belt drive and a clutch. A junction or intermediate junction 70 of the primary drive train is arranged on or associated with the shaft 11. One branch of the primary drive train leading from the junction 70 of the primary drive train connects the shaft 11 through gears 12, 13, 14 and 15 and a transmission 16 to a first spindle 17 defining a second termination on the one hand, and a second branch, for instance without the depicted compensating gear box or drive 41, connects the shaft 11 through gears 19 through 34 with a second spindle 35 defining a first termination, on the other hand. In this embodiment, a gear tooth cutter or cutter head 18 is mounted on the first spindle 17 as a cutting tool and a gear blank 36 is mounted on the second spindle 35 as a workpiece. The directions of rotation of both spindles 17 and 35 are mutually opposed as indicated by the solid black arrows delineated on the gears or on their shafts. The arrangement just described represents the present state of the art, i.e. spiral bevel and contrate gears can be cut according to extended epicycloids with this arrangement.

For cutting gears according to extended hypocycloids, the direction of rotation of one of the spindles, for instance of the second spindle 35, must be altered or reversed as indicated by the outlined white arrows. To this end the gears 30 and 31 are mounted upon a change or back gear lever arrangement 37 and augmented by a supplementary intermediate gear 38 for reversing the direction of rotation of the gears 32, 33 and 34. This arrangement is schematically indicated in chain dotted lines. This particular alteration to the primary drive train will be hereinafter referred to as an intermediate reversing drive train 60. In order to eliminate a possible pronounced chatter or backlash caused in the primary drive train by forward cutting or climb-cutting, an auxiliary drive means 40 is supplementarily connected to the primary drive train in the vicinity of the second spindle 35, in the arrangement depicted in FIG. 3 through a pinion 39. This auxiliary drive means 40 operates on the spindle 35 in the same direction of rotation as the main drive means 10 and maintains the primary drive train, respectively the portion of the primary drive train extending between the second spindle 35 and the main drive means 10, under constant load. The torque requisite for generating the constant load for the primary drive train while the gear tooth cutter or cutter head 18 and the workpiece or gear blank 36 perform their relative machining rotations can be selected or adjusted on a not particularly shown control means of the auxiliary drive means 40 in accordance with the maximum expected power demands of the main drive means 10.

The procedure described in relation to FIG. 3 relates to gear-cutting according to the continuous process without any generation process. Gear cutting machines with which gear-generating processes can also be selectively performed additionally comprise a generating drum or roll cradle 52 with a first spindle 17 and an internal transmission 16. Such gear cutting machines have a compensating gear box or drive 41, for instance located at or near the previously mentioned junction 70 in the primary drive train at the shaft 11, for connecting a secondary or gear-generating drive train with the primary drive train. The gear-generating drive train is driven by a reversible rotary drive means 51, for instance an electric or hydraulic motor, and connects the generating drum or roll cradle 52 through a work drive 50 and gears 42 through 49 to the compensating gear box or drive 41. As is known per se, a rotary or roll motion can thus be selectively imparted to the second spindle 35 and superimposed upon its rotation. This rotary or roll motion can be in the same direction as or in the opposite direction to the rotation of the second spindle 35. The additional torque acting on the spindle 35 is negligible and the play or clearance in the gear-generating drive train does not have a detrimental effect on the primary drive train in either direction of rotation.

The reversible auxiliary drive means 40 can also advantageously be employed for generating a braking torque at the second spindle 35 when cutting gears according to extended epicycloids by applying its driving torque to the spindle 35 in a direction of rotation opposed to the torque of the main drive means 10. In other words the primary drive train is now maintained in contact on the other tooth flanks, the "tension" flanks. The heretofore usual braking devices of mechanical or hydraulic nature can be omitted.

Drive systems such as those proposed here for use as the auxiliary drive means 40, are known in the form of feed drive means and contain, for instance, a thyristor circuit and a DC-motor. They are suited for producing an adjustable constant positive or negative torque up to a maximum allowable rotary speed.

While there are shown and described present preferred embodiments of the invention, it is to be distinctly understood that the invention is not limited thereto, but may be otherwise variously embodied and practiced within the scope of the following claims.

Accordingly what I claim is:

1. A gear cutting machine for cutting spiral bevel gears and contrate gear face clutches having cycloidal tooth flank generatrices according to the continuous gear-cutting process, comprising:
   a rotary first spindle for mounting a gear tooth cutter;
   a rotary second spindle for holding a gear blank;
   a drive gear mounted on said second spindle for driving said second spindle in rotation;
   a primary drive train operatively interconnecting said first and second spindles for continuously rotatingly driving said first and second spindles;
   said primary drive train having a termination thereof at said second spindle;
   a reversible main drive means operatively connected to said primary drive train for simultaneously driving said first and second spindles and including means for reversing said reversible main drive means;
   said primary drive train comprising an intermediate reversing drive train for selectively engaging a desired one of mutually identical directions of rotation for said first and second spindles for cutting gears having hypocycloidal tooth flank generatrices and mutually opposed directions of rotation for said first and second spindles for cutting gears having epicycloidal tooth flank generatrices;
   the gear cutting machine possessing a predetermined maximum eccentric spacing;
   said intermediate reversing drive train for selectively engaging a desired one of said mutually identical directions of rotation and said mutually opposed directions of rotation permitting a greater maximum allowable working region of the gear cutting machine at said predetermined maximum eccentric spacing for gears having hypocycloidal tooth flank generatrices than for gears having epicycloidal tooth flank generatrices according to the formula;

$$Rm = r_w \cdot \cos\omega + \sqrt{Ex^2 - r_w^2 + (r_w \cdot \cos\omega)^2}$$

wherein:
$\omega = 90° - \beta_m + \delta_w$ for epicycloids; and
$\omega = 90° - \beta_m - \delta_w$ for hypocycloids; and
a reversible auxiliary drive means directly engaging said drive gear at said termination of said primary drive train for supplementally driving said second spindle to maintain said primary drive train under substantially constant load for suppressing backlash in said primary drive train and including means for reversing said reversible auxilary drive means.

2. The gear cutting machine as defined in claim 1, wherein:
   said intermediate reversing drive train is situated near said second spindle.

3. The gear cutting machine as defined in claim 1, wherein:
   said primary drive train comprises an intermediate junction thereof;
   said termination of said primary drive train defining a first termination thereof;
   said primary drive train comprising a second termination thereof at said first spindle and a third termination thereof at said main drive means;
   said main drive means being arranged at said third termination ahead of said junction;
   said first spindle being arranged at said second termination subsequent to said junction; and
   said second spindle being arranged at said first termination subsequent to said junction.

4. The gear cutting machine as defined in claim 1, further including:
   a generating drum;
   said first spindle being mounted in said generating a secondary drive train;
   said gear-generating drive train comprising a compensating drive mechanism;
   said gear-generating drive train operatively interconnecting said generating drum and said primary drive train for imparting a supplementary generating roll motion to said second spindle; and a reversible generating motion drive means connected to said gear-generating drive train for selectively activating said generating roll motion.

5. The gear cutting machine as defined in claim 1, wherein:
said reversible main drive means and said reversible auxiliary drive means both engage said primary drive train for driving said primary drive train in a direction of rotation commensurate with said desired mutually identical directions of rotation of said first and second spindles for suppressing backlash when cutting gear teeth having hypocycloidal tooth flank generatrices.

6. The gear cutting machine as defined in claim 1, wherein:
said reversible main drive means and said reversibel auxiliary drive means each engage said primary drive train for driving said primary drive train with opposed directions of rotation for suppressing backlash in said primary drive train when cutting gear teeth having epicycloidal tooth flank generatrices.

7. A method of cutting spiral bevel gears and contrate gear face clutches having hypocycloidal tooth flank generatrices according to the continuous gear-cutting process by means of a gear cutting machine comprising: a rotary spindle for mounting a cutter; a rotary second spindle for holding a gear blank; a reversible main drive means; means for reversing said reversible main drive means; a primary drive train operatively interconnecting the first and second spindles and the main drive means and having a junction, a termination at the second spindle, and an intermediate reversing drive means arranged between the junction and the second spindle for selectively engaging a desired one of mutually identical and mutually opposed directions of rotation for the first and second spindles; a reversible auxiliary drive means connected to the termination of the primary drive train for suppressing backlash; and means for reversing said reversible auxiliary drive means; said method comprising the steps of:
operating said reversible main drive means to drive said first spindle in a desired direction of cutter rotation;
operating said reversing drive train to engage a direction of gear blank rotation of said second spindle identical to said desired direction of cutter rotation of said first spindle such that for a given eccentric spacing of the gear cutting machine, the gear cutting machine permits a greater maximum working region for gears having hypocycloidal tooth flank generatrices than for gears having epicycloidal tooth flank generatrices according to the formula:

$$Rm = r_w \cdot \cos\omega + \sqrt{Ex^2 - r_w^2 + (r_w \cdot \cos\omega)^2}$$

wherein:
$\omega = 90° - \beta_m + \delta_w$ for epicycloids; and
$\omega = 90° - \beta_m - \delta_w$ for hypocycloids; and
operating said reversible auxiliary drive means to drive said second spindle in said desired direction of gear blank rotation of said second spindle identical to said desired direction of cutter rotation of said first spindle for suppressing backlash in said primary drive train.

8. A method of cutting spiral bevel gears and contrate gear face clutches having epicycloidal tooth flank generatrices according to the continuous gear-cutting process by means of a gear cutting machine comprising: a rotary first spindle for mounting a cutter; a rotary second spindle for holding a gear blank; a reversible main drive means; means for reversing said reversible main drive means; a primary drive train operatively interconnecting the first and second spindles and the main drive means and having a junction, a termination at the second spindle, and an intermediate reversing drive means arranged between the junction and the second spindle for selectively engaging a desired one of mutually identical and mutually opposed directions of rotation for the first and second spindles; a reversible auxiliary drive means connected to the termination of the primary drive train for suppressing backlash; and means for reversing said reversible auxiliary drive means; said method comprising the steps of:
operating said reversible main drive means to drive said first spindle in a desired direction of cutter rotation;
operating said reversing drive train to engage a direction of gear blank rotation of said second spindle opposed to said desired direction of cutter rotation of said first spindle such that for a given eccentric spacing of the gear cutting machine, the gear cutting machine has a lesser maximum allowable working region for gears having epicycloidal tooth flank generatrices than for gears having hypocycloidal tooth flank generatrices according to the formula:

$$Rm = r_w \cdot \cos\omega + \sqrt{Ex^2 - r_w^2 + (r_w \cdot \cos\omega)^2}$$

wherein:
$\omega = 90° - \beta_m + \delta_w$ for epicycloids; and
$\omega = 90° - \beta_m - \delta_w$ for hypocycloids; and
operating said reversible auxiliary drive means to drive said second spindle in said desired direction of gear blank rotation of said second spindle opposed to said desired direction of cutter rotation of said first spindle for suppressing backlash in said primary drive train.

9. A method of cutting spiral bevel gears and contrate gear face clutches having hypocycloidal tooth flank generatrices according to the continuous gear-cutting process by means of a gear cutting machine comprising: a rotary first spindle for mounting a cutter; a rotary second spindle for holding a gear blank; a reversible main drive means; means for reversing said reversible main drive means; a primary drive train operatively interconnecting the first and second spindles and the main drive means and having a junction, a termination at the second spindle, and an intermediate reversing drive means arranged between the junction and the second spindle for selectively engaging a desired one of mutually identical and mutually opposed directions of rotation for the first and second spindles; a reversible auxiliary drive means connected to the termination of the primary drive train for suppressing backlash; and means for reversing said reversible auxiliary drive means; said method comprising the steps of:
operating said reversible main drive means to drive said first spindle in a desired direction of cutter rotation;
operating said reversing drive train to engage a direction of gear blank rotation of said second spindle identical to said desired direction of cutter rotation of said first spindle such that for a given eccentric spacing of the gear cutting machine, the gear cutting machine permits a greater maximum working region for gears having hypocycloidal tooth flank generatrices than for gears having epicycloidal tooth flank generatrices; and operating said reversible auxiliary drive means to drive said second spindle in said desired direction of gear blank rotation of said second spindle identical to said desired direction of cutter rotation of said first spindle for suppressing backlash in said primary drive train.

10. A gear cutting machine for cutting spiral bevel gears and contrate gear face clutches having cycloidal tooth flank generatrices according to the continuous gear-cutting process, comprising:

a rotary first spindle for mouting a gear tooth cutter;

a rotary second spindle for holding a gear blank;

a drive gear mounted on said second spindle for driving said second spindle in rotation;

a primary drive train operatively interconnecting said first and second spindles for continuously rotatingly driving said first and second spindles;

said primary drive train having a termination thereof at said second spindle;

a reversible main drive means operatively connected to said primary drive train for simultaneously driving said first and second spindles and including means for reversing said reversible main drive means;

said primary drive train comprising an intermediate reversing drive train for selectively engaging a desired one of mutually identical directions of rotation for said first and second spindles for cutting gears having hypocycloidal tooth flank generatrices and mutually opposed directions of rotation for said first and second spindles for cutting gears having epicycloidal tooth flank generatrices;

the gear cutting machine possessing a predetermined maximum eccentric spacing; and a reversible auxiliary drive means directly engaging said drive gear at said termination of said primary drive train for supplementally driving said second spindle to maintain said primary drive train under substantially constant load for suppressing backlash in said primary drive train and including means for reversing said reversible auxiliary drive means.

* * * * *

UNITED STATES PATENT AND TRADEMARK OFFICE
CERTIFICATE OF CORRECTION

PATENT NO. : 4,664,569

DATED : May 12, 1987

INVENTOR(S) : ERICH KOTTHAUS

It is certified that error appears in the above-identified patent and that said Letters Patent is hereby corrected as shown below:

```
Column 9, line 16, after "said" (second occurence) please
delete "reversibel" and insert --reversible--

Column 9, line 27, after "rotary" (first occurence) please
insert --first--
```

Signed and Sealed this

Twenty-seventh Day of October, 1987

Attest:

DONALD J. QUIGG

Attesting Officer

Commissioner of Patents and Trademarks